Figure 1:
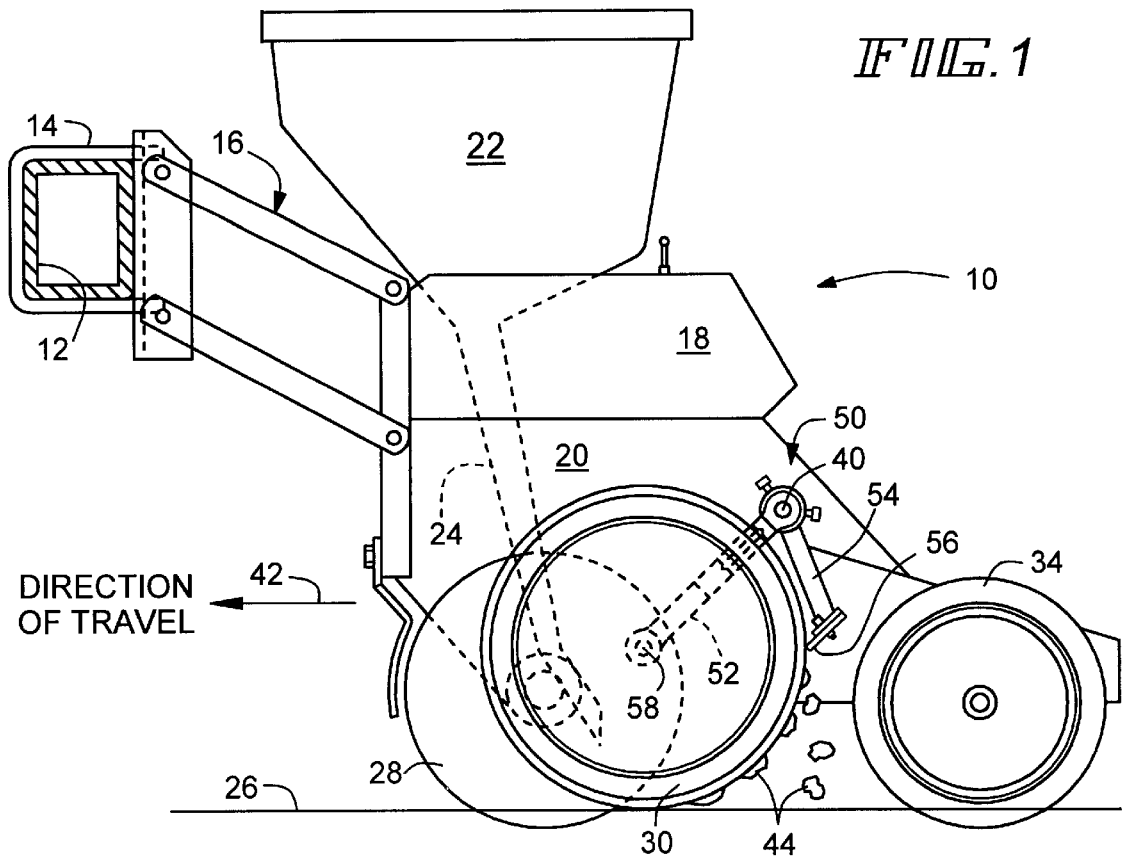

United States Patent
Shoup

Patent Number: 5,884,711
Date of Patent: Mar. 23, 1999

[54] GAUGE WHEEL SCRAPER

[75] Inventor: Kenneth E. Shoup, Bonfield, Ill.

[73] Assignee: Shoup Manufacturing Company, Chicago, Ill.

[21] Appl. No.: 842,607

[22] Filed: Apr. 15, 1997

[51] Int. Cl.⁶ ............................................... A01B 15/00
[52] U.S. Cl. ........................... 172/610; 172/558; 111/137
[58] Field of Search ...................... 172/558, 559, 172/610, 560, 561, 562, 563; 111/135, 136, 137, 194; 280/585, 856

[56] References Cited

U.S. PATENT DOCUMENTS

| | | | |
|---|---|---|---|
| 285,184 | 9/1883 | Vest . | |
| 501,917 | 7/1893 | Caldwell | 172/558 |
| 708,265 | 9/1902 | Shuping | 172/558 |
| 787,016 | 4/1905 | Wimer | 172/558 |
| 819,701 | 5/1906 | Fowler | 172/558 |
| 873,142 | 12/1907 | Wilhelm | 172/558 |
| 1,074,763 | 10/1913 | Wills . | |
| 1,296,452 | 3/1919 | Ballard . | |
| 1,298,209 | 3/1919 | Heylman | 172/558 |
| 1,311,773 | 7/1919 | Ray . | |
| 1,723,705 | 8/1929 | Packer | 172/558 |
| 1,837,347 | 12/1931 | Vandine . | |
| 2,571,285 | 10/1951 | Oehler | 280/158 |
| 2,737,871 | 3/1956 | Rogers | 172/610 X |
| 4,603,746 | 8/1986 | Swales | 172/559 |
| 4,669,550 | 6/1987 | Sittre | 172/559 |
| 5,235,922 | 8/1993 | Deckler | 111/137 |
| 5,269,380 | 12/1993 | Lofquist et al. | 172/558 |
| 5,297,497 | 3/1994 | Schmidt | 172/610 X |
| 5,431,233 | 7/1995 | Schmidt | 172/558 |
| 5,443,125 | 8/1995 | Clark et al. | 172/608 |
| 5,495,897 | 3/1996 | Javerlhac | 172/558 X |
| 5,507,351 | 4/1996 | Martin | 172/558 |
| 5,626,196 | 5/1997 | Hughes | 172/558 |

FOREIGN PATENT DOCUMENTS

| | | | |
|---|---|---|---|
| 338646 | 10/1989 | European Pat. Off. | 172/610 |
| 2438374 | 2/1976 | Germany | 172/610 |
| 3317485 | 11/1984 | Germany | 172/610 |

OTHER PUBLICATIONS

Shoup Manufacturing Company, "The Equalizer" brochure, p. 27, Spring 1995.

*Primary Examiner*—Thomas B. Will
*Assistant Examiner*—Victor Batson
*Attorney, Agent, or Firm*—Emrich & Dithmar

[57] ABSTRACT

A scraper is disposed aft of and in closely spaced relation to a gauge wheel such as attached to an agricultural implement as in a planter row unit to remove soil from the wheel as the implement traverses a field. Maintaining the gauge wheel free of soil ensures proper height of the implement relative to the soil surface. The scraper includes a flat plate adjustably attached to a mounting assembly which allows for spacing between the plate and periphery of the gauge wheel to be adjusted as the plate wears with use. A leading edge of the plate disposed immediately adjacent the gauge wheel is contoured to closely match the gauge wheel contour for efficient soil removal. The mounting assembly includes a gauge wheel arm and a scraper arm rigidly coupled together at respective ends thereof and pivotally mounted to the implement where the two arms are connected together. The scraper plate is attached to a second opposed end of the scraper arm, while the second opposed end of the gauge wheel arm is attached to the gauge wheel's axle, or spindle. The entire assembly is free to pivot on the implement as the gauge wheel encounters obstacles and irregularities in the field. Rigidly connecting the gauge wheel and the scraper together while allowing both to pivot about a common axis ensures that the scraper remains a fixed distance from the gauge wheel's periphery regardless of the position of the gauge wheel.

16 Claims, 3 Drawing Sheets

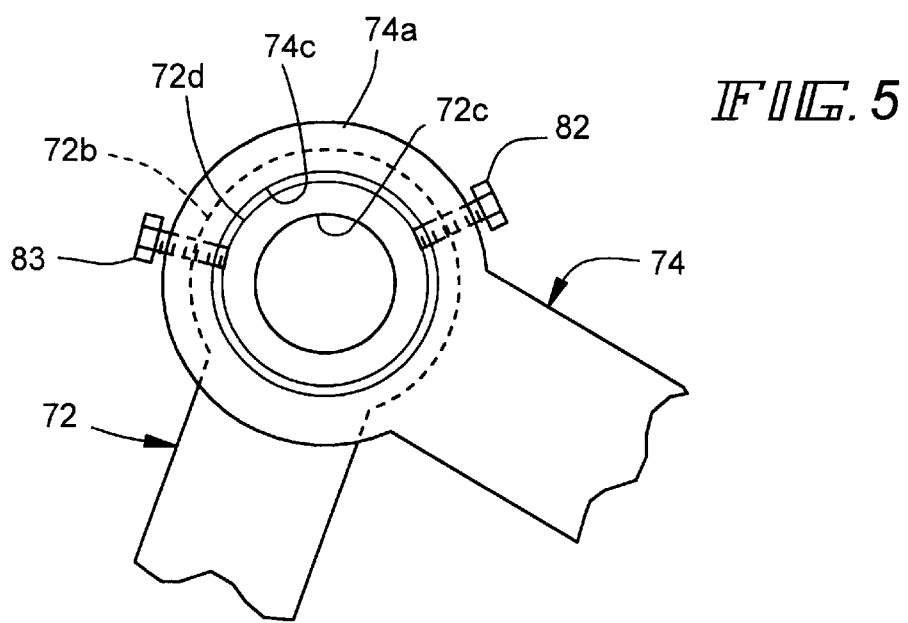
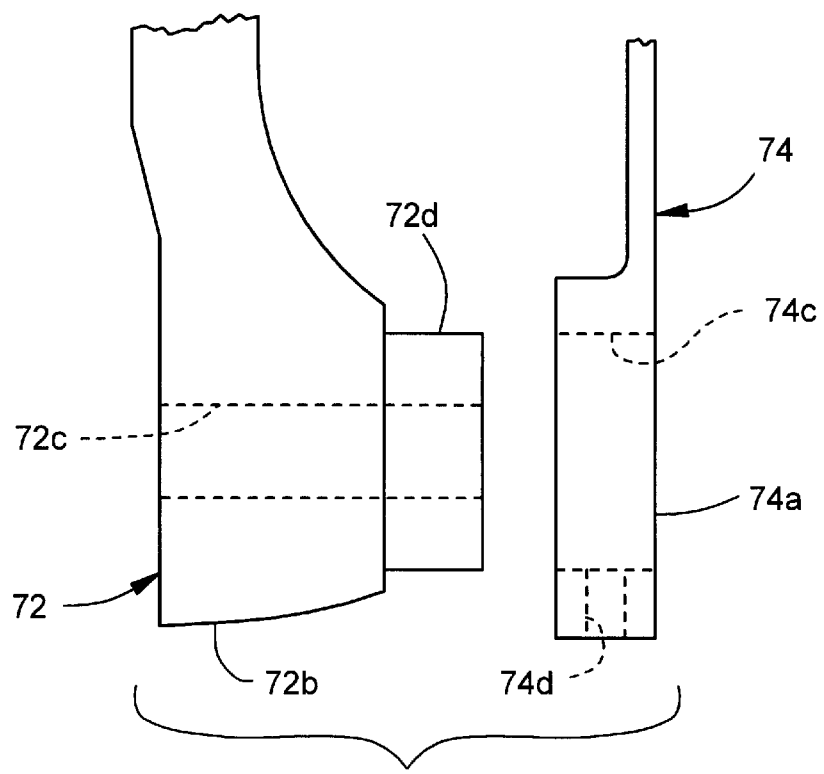

GAUGE WHEEL SCRAPER

FIELD OF THE INVENTION

This invention relates generally to agricultural implements such as used in ground tillage and is particularly directed to a gauge wheel scraper for maintaining a gauge wheel such as attached to a ground working implement free of soil residue.

BACKGROUND OF THE INVENTION

In many agricultural tillage operations, it is desirable to maintain the ground engaging implement a fixed distance beneath the soil surface. One example of this can be found in planter row units which employ a pair of forward discs arranged in a "V" configuration to form a furrow in the soil in which seeds are deposited. Depth gauge wheels are positioned aft of the furrow forming discs to limit the depth of the seed furrow formed by the discs. Seeds are periodically deposited in the furrow through a seed tube typically disposed aft of the furrow forming discs and between the gauge wheels. A pair of trailing furrow covering wheels, or discs, close the seed furrow after the seeds have been deposited in the furrow. The depth at which the seeds are deposited is important for future plant growth. The depth gauge wheels are thus an important element in the planting procedure. A problem can arise during wet, muddy conditions when soil residue adheres to the gauge wheels causing the seeds to be deposited at an improper soil depth and even sometimes on the surface of the soil. This may have an adverse affect on subsequent plant growth and may even result in failure of the plant to grow.

Various approaches have been adopted to maintain the gauge wheels clean of soil residue for proper depth control of the implement. In many installations, a scraper is maintained in closely spaced position from the periphery of the gauge wheel by attaching the scraper by suitable linkage to a support arm for the gauge wheel. A U-clamp with bolts typically is used to attach the scraper linkage to the gauge wheel's support arm. This mounting arrangement has led to problems because the gauge wheel support arm is typically tapered and results in the U-clamp working its way loose and improper positioning of the scraper element. An example of this type of installation for a paddle-type scraping wheel is shown in U.S. Pat. No. 5,443,125. Another arrangement where the scraper element is mounted to the planter frame is disclosed in U.S. Pat. No. 285,184. Other approaches attach the scraper element to the axle or hub of the gauge wheel such as shown in U.S. Pat. Nos. 1,074,763; 2,571,285; 5,269,380; and 5,431,233. All of these latter approaches employ complicated mounting linkage for the scraper element which limits the positioning flexibility of the scraper element relative to the gauge wheel and does not render the position of the scraper element dependent only upon the position of the gauge wheel.

The present invention addresses the aforementioned limitations of the prior art by providing a gauge wheel scraper arrangement wherein a scraper plate is maintained in fixed, closely spaced relation from an aft portion of the gauge wheel's periphery. The scraper is attached to a scraper support arm which, in turn, is coupled to a gauge wheel support arm causing the gauge wheel and scraper to move in unison as the gauge wheel is displaced vertically as it traverses a field to maintain the scraper in fixed position relative to the gauge wheel periphery.

OBJECTS AND SUMMARY OF THE INVENTION

Accordingly, it is an object of the present invention to maintain a ground engaging gauge wheel such as attached to tillage farming equipment free of soil residue as it traverses a field to ensure proper height of the tillage equipment relative to the soil surface.

It is another object of the present invention to provide a scraper for removing soil from the periphery of an agricultural gauge wheel wherein the scraper is attached to the gauge wheel support arm for maintaining fixed spacing between the scraper and gauge wheel.

Yet another object of the present invention is to provide a scraper adjustably mounted to an agricultural gauge wheel which permits scraper-gauge wheel spacing to be adjusted as the scraper element wears with use.

A further object of the present invention is to provide a scraper for an agricultural gauge wheel which is configured to match the contour of the gauge wheel periphery for more efficient soil removal from the gauge wheel.

This invention contemplates a scraper for a gauge wheel in an agricultural implement which is connected to the support arm attaching the gauge wheel to the implement. As the gauge wheel is displaced vertically upon encountering obstacles and irregularities in a traversed field, the scraper undergoes a corresponding movement so as to always be positioned in closely spaced relation to the gauge wheel's outer periphery. By coupling the connecting arrangements of both the gauge wheel and the scraper together as well as to the implement, the position of the scraper always tracks that of the gauge wheel to ensure fixed spacing therebetween regardless of the position of the gauge wheel. This ensures efficient removal of soil residue from the gauge wheel under all operating conditions.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a side elevation view shown partially in phantom of a row planter unit incorporating the gauge wheel scraper of the present invention;

FIG. 2 is a top view of the gauge wheel and scraper combination incorporated in the row planter unit of claim 1;

FIG. 3 is a perspective view of the inventive gauge wheel scraper shown mounted to the axle, or spindle, of the gauge wheel;

FIG. 4 is a side elevation view of a pair of gauge wheels with scrapers in accordance with the present invention illustrating pivoting upward displacement of one of the gauge wheels and the close positioning of each scraper to its associated gauge wheel;

FIG. 5 is a side elevation view shown partially in phantom of the connection between a gauge wheel support arm and its associated scraper support arm in the gauge wheel scraper of the present invention; and FIG. 6 shows adjacent ends of the gauge wheel support arm and scraper support arm aligned with one another to facilitate connecting the two support arms together in the gauge wheel scraper arrangement of the present invention.

DETAILED DESCRIPTION OF THE PREFERRED EMBODIMENT

Referring to FIG. 1, there is shown a side elevation view partially in phantom of a row planter unit 10 incorporating a gauge wheel scraper assembly 50 in accordance with the principles of the present invention. The row planter unit 10 includes an upper frame 18 and a lower frame 20. The row planter unit 10 is securely attached to a transverse tool bar 12 (shown in section) of an implement frame by means of the combination of a U-bolt and nut combination 14 and a flexible parallel linkage coupling arrangement 16. A plurality of such row planter units 10 are mounted in a spaced manner to the tool bar 12 which is aligned generally transverse to the direction of travel designated by arrow 42 in the figure. The tool bar 12 is part of an implement frame which is pulled in the direction of arrow 42 by means of a traction vehicle (not shown in the figure for simplicity). Parallel linkage coupling arrangement 16 permits the row planter unit 10 to be displaced vertically at it traverses the soil surface 26. Attached to the upper frame 18 are one or more seed hoppers 22. The lower portion of seed hopper 22 is shown in dotted line form and includes a seed discharge tube 24 through which seeds are discharged in a timed manner as the row planter unit 10 is displaced through a field.

Disposed on a lower portion of the row planter unit 10 and attached to the lower frame 20 by conventional means (not shown) are a pair of furrow-opening discs 28 (only one of which is shown in the figure for simplicity. Trailing the pair of furrow-opening discs 28 as the row planter unit 10 is displaced in the direction of arrow 42 are a pair of gauge wheels, one of which is shown as element 30 in FIG. 1. With reference also to FIG. 2, there is shown a top view of a pair of such gauge wheels which are identified as elements 30 and 32 in FIG. 2. The first and second gauge wheels 30, 32 are respectively attached to the planter unit's lower frame 20 by means of gauge wheel support arms 52,72, respectively, in combination with a mounting bolt 40. The gauge wheel support arms 52,72 are coupled together as well as connected to the planter unit's lower frame 20 by means of mounting bolt 40. Also attached to the planter unit's lower frame 20 and trailing the first and second gauge wheels 30, 32 as the row planter unit 10 is displaced in the direction of arrow 42 are one or more furrow closing wheels 34. During operation as the row planter unit 10 is displaced in the direction of arrow 42, the pair of furrow-opening discs 28 opens a furrow in the soil 26, seeds are discharged in a timed manner into the furrow from the seed discharge tube 24, and the seeds are then covered and the furrow closed by means of the trailing furrow closing wheels 34. The first and second gauge wheels 30,32 rotatably ride on the soil surface 26 and maintain the furrow-opening discs 28 as well as the furrow closing wheels 34 at the desired depth relative to the soil surface. As thus far described, the operation and configuration of the row planter unit 10 is conventional.

Figure 2:
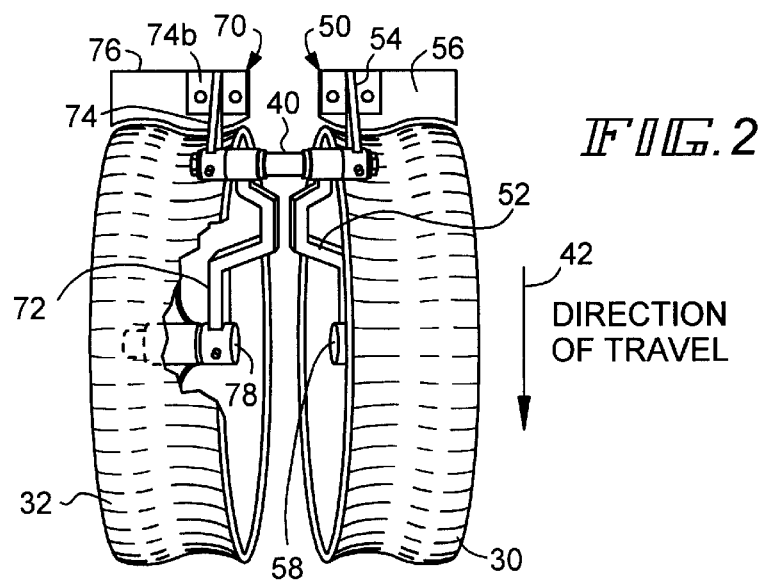
Figure 3:
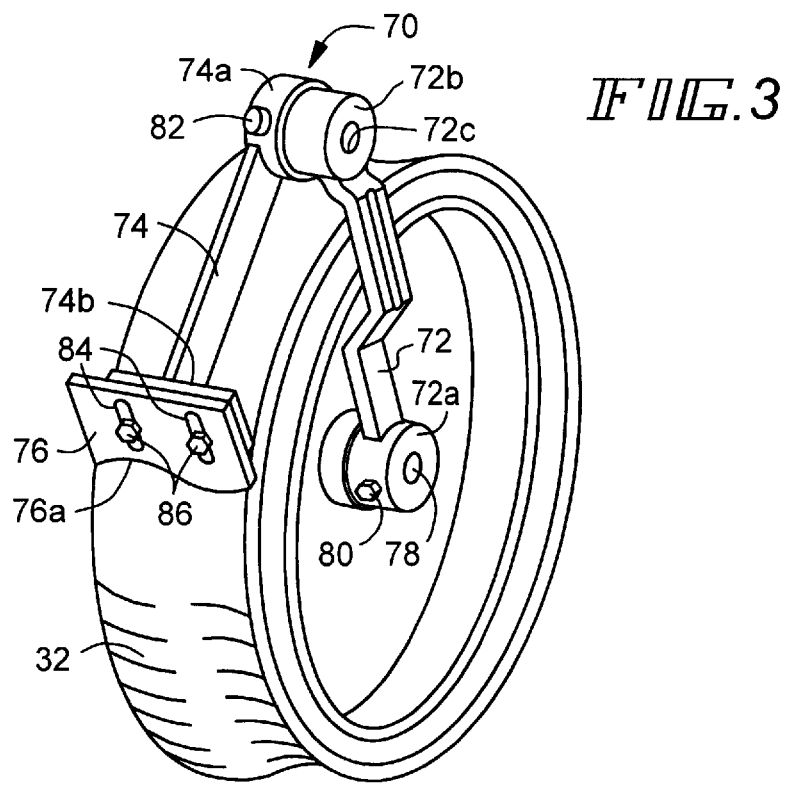

With reference to FIGS. 1 and 2 as well as to the perspective view of FIG. 3, details of first and second gauge wheel scraper assemblies 50, 70 in accordance with the present invention will now be described. As shown in FIG. 2, the first gauge wheel scraper assembly 50 operates with the first gauge wheel 30, while the second gauge wheel scraper assembly 70 operates with the second gauge wheel 32. The first gauge wheel 30 is positioned on a first spindle, or axle, 58 while the second gauge wheel 32 is positioned on a second axle 78. First and second axles 58, 78 are coupled to the planter's lower frame 20 by means of gauge wheel support arms 52 and 72, respectively. The gauge wheel support arms 52, 72 are free to pivot about mounting bolt 40 permitting the gauge wheels 30, 32 to be displaced upwardly as they encounter irregularities and obstacles in a field as shown in the side elevation view of FIG. 4 and as described in detail below. Details of the second gauge wheel scraper assembly 70, which is shown in the perspective view of FIG. 3, will now be described, it being understood that the configuration and operation of the two gauge wheel scraper assemblies 50, 70 are identical.

The second gauge wheel scraper assembly 70 is coupled to a distal end of the gauge wheel support arm 72. The proximal end of the gauge wheel support arm 72 includes a first hub 72a having an aperture therein which is adapted to receive axle 78. A set screw 80 inserted through aligned apertures in the first hub 72a of the gauge wheel support arm 72 and axle 78 and securely maintains the first support arm in fixed position on the axle while permitting the gauge wheel 32 to rotate, as is well known. Disposed on the distal end of the gauge wheel support arm 72 is a second hub 72b. Second hub 72b is inserted in a recessed portion of a collar 74a in one end of a scraper support arm 74 and is attached thereto. The two support arms are pivotally coupled together. A pair of set screws 82 inserted through collar 74a on the scraper support arm 74 engage hub 72b on the gauge wheel support arm 72 for maintaining the gauge wheel and scraper support arms in fixed relative position. Loosening of set screws 82 permits the scraper support arm 74 to be rotated relative to the gauge wheel. support arm 74. Hub 72b and collar 74a include respective aligned apertures which are adapted to receive mounting bolt 40 as shown in FIGS. 1 and 2 and as described above. Aperture 72c is shown for hub 72b on the end of the gauge wheel support arm 72 to in FIG. 3, while the aperture in collar 74a is not shown in the figure for simplicity. It is by means of the aforementioned mounting bolt that the two gauge wheels 30,32 and gauge wheel scraper assemblies 50,70 are pivotally attached to the lower frame 20 of the agricultural implement 10.

Disposed on a the end of the scraper support arm 74 away from the collar 74a is a mounting plate 74b having a pair of spaced apertures therein. Attached to mounting plate 74b by means of a pair of nut and bolt combinations 86 is a scraper plate 76. Scraper plate 76 includes a pair of spaced elongated linear slots 84 each aligned with a respective aperture in mounting plate 74b for receiving one of the nut and bolt combinations 86. The elongated linear slots 84 in scraper plate 76 permit the scraper plate to be moved toward or away from the periphery of gauge wheel 32. This allows the scraper plate 76 to be displaced toward the gauge wheel's periphery as, the scraper plate wears with use. In addition, the pivoting connection between the gauge wheel support arm 52 and support the scraper support arm 74 allows the scraper assemblies 50, 70 to be used with a range of variously sized gauge wheels 30, 32. Scraper plate 76 includes a leading edge 76a contoured to conform with the contour of the gauge wheel's outer periphery.

As shown in FIGS. 1 and 2, the first gauge wheel scraper assembly 50 similarly includes first and second support arms 52 and 54. The first gauge wheel scraper assembly 50 is mounted to the distal end of the gauge wheel support arm 52 and is attached thereto by means of set screws. The proximal end of the gauge wheel support arm 52 is securely attached to the gauge wheel's axle 58. Each scraper plate 56,76 is positioned aft of its associated gauge wheel 30, 32 as the implement moves in the direction of arrow 42 and is in closely spaced relation to the gauge wheel's outer periphery as shown in FIG. 1. Also as shown in FIG. 1, as clumps of soil 44 adhere to gauge wheel 30 as it rotates in a counter-clockwise direction, the soil clumps are scraped from the gauge wheel 30 by means of the scraper plate 56 and drop to the ground. This ensures that the gauge wheel 30, 32 is free of soil residue as it traverses the soil surface 26 for accurate positioning of the implement relative to the soil surface. The contoured leading edges of the scraper plates 56, 76 ensure complete and efficient removal of soil from the two gauge wheels 30, 32. Pivoting connections between each support arm in combination with the adjustable positioning feature of the scraper plate 56, 76 permits the scraper plate to be positioned in closely spaced relation to the gauge wheel's periphery.

Figure 4:
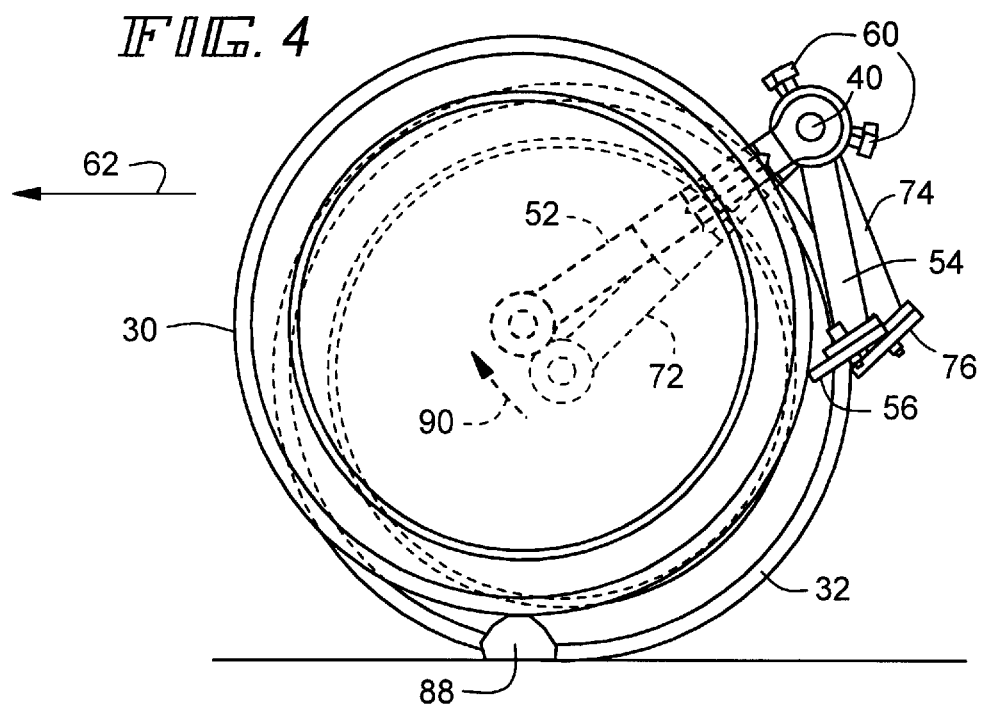

An important feature of the present invention is the manner in which the scraper plate 56, 76 is maintained in position relative to the periphery of its associated gauge wheel 30, 32. With reference particularly to FIG. 4, there is shown a side elevation view of the first and second gauge wheels 30, 32 traversing a field in the direction of arrow 62. As the first gauge wheel 30 encounters an irregularity in the field such as a rock 88, the first gauge wheel 30 and the gauge wheel support arm 52 are displaced upwardly and pivot about mounting bolt 40 clockwise in the direction of arrow 90. Set screws 60 maintain the gauge wheel support arm 52 and scraper support arm 54 in fixed relative position during the upward pivoting displacement of the first gauge wheel 30. Thus, as the gauge wheel support arm 52 pivots upwardly about mounting bolt 40, the scraper support arm 54 undergoes a corresponding pivoting displacement because the two support arms are rigidly connected together. With the scraper support arm 54 undergoing the same displacement as the gauge wheel support arm 52 as gauge wheel 30 pivots about mounting bolt 40, scraper plate 56 disposed on the distal end of the scraper support arm 54 is maintained in closely spaced relation to the periphery of gauge wheel 30. Thus, because the gauge wheel support arm 52 and the scraper plate support arm are rigidly connected together and pivot about a common axis aligned with mounting bolt 40, scraper plate 56 maintains a fixed position relative to the periphery of gauge wheel 30 regardless of the position of the gauge wheel.

Referring to FIG. 5, there is illustrated a side elevation view shown partially in phantom of the connection between support arms 72 and 74. FIG. 6 shows adjacent ends of support arms 72, 74 aligned with one another to facilitate connecting the two support arms together in the gauge wheel scraper assembly of the present invention. Gauge wheels support arm 72 is connected to the gauge wheel's axle 78 and includes the second hub 72b as described above. Disposed within the second hub 72b is a circular aperture 72c adapted for receiving the aforementioned mounting bolt in connecting the gauge wheel 32 and scraper assembly 70 to the row planter unit 10 also as described above. The gauge wheel support arm's second hub 72b is provided with an outer end portion 72d of reduced outer diameter as seen in FIG. 6. Outer reduced end portion 72d is adapted for tight fitting insertion in the circular aperture 74c of collar 74a of scraper support arm 74. This connection between gauge wheel support arm 72 and scrappes support arm 74 allow for free pivoting relative displacement between the two support arms. Collar 74a of scraper support arm 74 includes one or more threaded slots therein as shown in phantom for the case of threaded slot 74d in FIG. 6. Each of the threaded slots is adapted to receive a respective set screw 82 and 83 as shown in FIG. 5. When tightened, set screws 82 and 83 engage the outer reduced end portion 72d of gauge wheel support arm 72 for fixedly connecting the two support arms. In this manner, the relative position of the gauge wheel support arm 72 and the scraper support arm 74, or the angle between the support arms, may be adjusted by pivoting scraper support arm 74 relative to gauge wheel support arm 72, followed by secure, fixed coupling of the two support arms by means of the aforementioned set screws 82,83, once the desired relative position of the two support arms is achieved. Changing the relative position of the two support arms 72,74 may be necessary to accommodate different sized gauge wheels, various implement frames and installation arrangements, or a variety of operating conditions. The outer reduced end portion 72d of the second end eye 72b of gauge wheel support arm 72 facilitates installation and removal of scraper support arm 74 as well as adjusting the angle between these two support arms.

There has thus been shown a gauge wheel scraper arrangement which maintains fixed spacing between a scraper element and the outer periphery of the gauge wheel regardless of the position of the gauge wheel as it traverses a field. The gauge wheel scraper assembly includes gauge wheel and scraper support arms rigidly coupled together and further respectively coupled to the gauge wheel's axle and to a scraper element in the form of a flat plate. The gauge wheel and scraper support arms are further pivotally coupled to an agricultural implement frame where the two arms are connected together permitting the gauge wheel and scraper, as well as their respective support arms, to undergo the same displacement as the gauge wheel encounters irregularities and obstacles in the field. Rigidly connecting the scraper and the gauge wheel while permitting both to undergo pivoting displacement with respect to the implement frame as the gauge wheel moves up and down in response to obstacles and irregularities in the field ensures that the scraper remains a fixed distance from the gauge wheel's periphery for efficient removal of soil therefrom.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for removing soil from a gauge wheel attached to an agricultural implement and having an axle, said apparatus comprising:

a gauge wheel support arm having first and second opposed ends, wherein said first end is capable of being coupled to the axle;

a scraper support arm having a collar at one end and an opposed end, wherein the collar of said scraper support arm is capable of being coupled to the second end of said gauge wheel support arm;

said second end of said gauge wheel support arm having a section of reduced diameter extending therefrom which fits within said collar on said scraper support arm, means for pivotally connecting the second end of said first support arm and the collar of said scraper support arm to the agricultural implement for allowing vertical displacement of the gauge wheel as the gauge wheel encounters obstacles and irregularities in a field traversed by the agricultural implement; and a scraper plate attached to the opposed end of said scraper support arm and maintained in closely spaced relation to the periphery of the gauge wheel as the gauge wheel undergoes vertical displacement for removing soil from the gauge wheel.

2. The apparatus of claim 1 further comprising adjustable positioning means for moving said scraper plate toward the periphery of the gauge wheel as said scraper plate wears down with usage.

3. The apparatus of claim 2 wherein said adjustable positioning means includes at least one nut and bolt combination inserted through aligned apertures in said opposed end of said scraper support arm and through said scraper plate.

4. The apparatus of claim 3 wherein the aperture in said scraper plate is linear and elongated in shape.

5. The apparatus of claim 1 wherein said scraper plate includes a contoured leading edge proximately disposed relative to the periphery of the gauge wheel and wherein the contour of said leading edge matches the contour of the periphery of the gauge wheel.

6. The apparatus of claim 1 wherein said gauge wheel support arm includes a hub on the first end thereof, said apparatus further including set screw inserted through and capable of being connected to said hub of said gauge wheel support arm with a gauge wheel.

7. The apparatus of claim 1 wherein said means for pivotally connecting said gauge wheel support arm and said scraper support arm includes a hub and collar.

8. The apparatus of claim 7 wherein a set screw connects said gauge wheel support arm and said scraper support arm.

9. The apparatus of claim 1 further comprising means for rigidly connecting said second end of said gauge wheel support arm and said collar of said scraper support arm.

10. The apparatus of claim 9 wherein said means for rigidly connecting said second end of said gauge wheel support arm and said collar of said scraper support arm includes a pivoting coupling in combination with spaced apart set screws connected to said gauge wheel and scraper support arms.

11. The apparatus of claim 10 wherein there are two spaced apart set screws for maintaining said scraper support arm and said scraper plate attached thereto in fixed relationship to said gauge wheel support arm and the gauge wheel mounted thereon.

12. The apparatus of claim 11 wherein said set screws are threadably inserted through said collar of said scraper support arm.

13. The apparatus of claim 12 further comprising a mounting bolt attached to the agricultural implement wherein the second end of said gauge wheel support arm includes a second generally circular aperture, and wherein said mounting bolt is inserted in said second generally circular aperture for pivotally coupling said gauge wheel and scraper support arms to the agricultural implement.

14. A combination of a gauge wheel pivot arm and an arrangement for removing soil from the periphery of a gauge wheel capable of being connected to said gauge wheel pivot arm, wherein the gauge wheel is capable of being attached to the agricultural implement by means of said gauge wheel pivot arm rotatably mounted at one end thereof on an elongated member allowing the gauge wheel to move vertically when obstacles and irregularities are encountered as the agricultural implement traverses a field and wherein the gauge wheel is positioned on and rotates about an axle, said combination comprising:

a mounting hub on the other end of said gauge wheel pivot arm attached to the gauge wheel axle;

said gauge wheel pivot arm having a section of reduced diameter extending from the one end therefrom;

a scraper pivot arm having first and second opposed ends, wherein said second end is coaxially mounted on and rigidly coupled to said section of reduced diameter extending from said gauge wheel pivot arm and wherein the first end of said scraper pivot arm moves with the gauge wheel as the gauge wheel is displaced vertically;

a scraper element connected to the first end of said scraper pivot arm and disposed adjacent the periphery of the gauge wheel, wherein said scraper element remains adjacent the periphery of the gauge wheel during vertical displacement of the gauge wheel to remove soil therefrom; and adjustable mounting means for connecting said scraper element to the first end of said scraper pivot arm to permit said scraper element to be moved toward the gauge wheel as said scraper element wears down with use.

15. A support and scraper arrangement for a gauge wheel attached to an agricultural implement, said arrangement comprising:

a gauge wheel elongated arm having first and second opposed ends;

a first hub disposed on the first end of said gauge wheel arm and including a first aperture therein for attachment to an axle of the gauge wheel;

a second hub disposed on the second end of said gauge wheel arm and including a second aperture therein for attachment to bolt means mounted to the agricultural implement for pivotally attaching said gauge wheel arm thereto, said second hub including a section of reduced outer diameter; and a scraper arm having a collar at one end thereof and a scraper plate coupled to the other end thereto disposed adjacent an outer periphery of the gauge wheel, said collar including a generally circular third aperture for receiving the section of reduced outer diameter of said second hub in a tight fitting manner for connecting said gauge wheel and scraper arms.

16. The arrangement of claim 15 wherein said collar on said scraper arm further includes at least one threaded hole for receiving a respective set screw, wherein said set screw engages the second hub of said gauge wheel arm for fixedly connecting said gauge wheel and scraper arms.

* * * * *